US012295904B2

(12) United States Patent
Dilorenzo

(10) Patent No.: US 12,295,904 B2
(45) Date of Patent: May 13, 2025

(54) ASSISTIVE AMBULATION SYSTEMS

(71) Applicant: Robert L. Dilorenzo, Milford, PA (US)

(72) Inventor: Robert L. Dilorenzo, Milford, PA (US)

(*) Notice: Subject to any disclaimer, the term of this patent is extended or adjusted under 35 U.S.C. 154(b) by 387 days.

(21) Appl. No.: 17/909,569

(22) PCT Filed: Mar. 5, 2021

(86) PCT No.: PCT/US2021/021058
§ 371 (c)(1),
(2) Date: Sep. 6, 2022

(87) PCT Pub. No.: WO2021/178783
PCT Pub. Date: Sep. 10, 2021

(65) Prior Publication Data
US 2023/0320921 A1 Oct. 12, 2023

Related U.S. Application Data

(60) Provisional application No. 62/985,944, filed on Mar. 6, 2020.

(51) Int. Cl.
*A61H 3/00* (2006.01)
*A61H 3/04* (2006.01)

(52) U.S. Cl.
CPC ............... *A61H 3/008* (2013.01); *A61H 3/04* (2013.01); *A61H 2201/0173* (2013.01); (Continued)

(58) Field of Classification Search
CPC ................................. A61H 3/008; A61H 3/04
See application file for complete search history.

(56) References Cited

U.S. PATENT DOCUMENTS 339,650 A 4/1886 Hill
1,611,807 A * 12/1926 Bergh ..................... A61H 3/04 482/69

(Continued)

FOREIGN PATENT DOCUMENTS

CA 2302061 A1 9/2001
CH 416940 A 7/1966

(Continued)

OTHER PUBLICATIONS

International Searching Authority (ISA/US). International Search Report and Written Opinion. Issued in PCT Application No. PCT/US2021/021058 on May 26, 2021. 9 pages.

*Primary Examiner* — Robert Canfield
(74) *Attorney, Agent, or Firm* — Meunier Carlin & Curfman LLC

(57) ABSTRACT

An example assistive ambulation system is described herein. The system includes a walker including a base frame, a walker frame attached to the base frame, a plurality of rolling members attached to the base frame, and a hoist attached to the walker. The base frame includes a pair of support members and a base cross member. Each of the support members extends between forward and rearward ends of the walker. Additionally, the pair of support members are spaced apart and substantially parallel to one another. The base cross member extends transversely between the pair of support members. The walker frame includes a pair of bent posts and a walker cross member. Each of the bent posts extends upward from the base frame. Additionally, the pair of bent posts are spaced apart and substantially parallel to one another. The walker cross member extends transversely between the pair of bent posts.

18 Claims, 11 Drawing Sheets

(52) U.S. Cl.
CPC ................ *A61H 2201/0192* (2013.01); *A61H 2201/1207* (2013.01); *A61H 2201/1633* (2013.01); *A61H 2201/1652* (2013.01)

(56) References Cited

U.S. PATENT DOCUMENTS 2,625,202 A * 1/1953 Richardson .............. A61H 3/04 482/68
2,719,568 A * 10/1955 Webb ..................... A61H 3/008 450/94
2,792,052 A * 5/1957 Johannesen .......... A61G 7/1053 482/67
2,819,755 A 1/1958 Berger et al.
2,991,485 A 7/1961 Schulte
3,189,345 A 6/1965 Simpson
3,252,704 A * 5/1966 Wilson ................. A61G 7/1017 482/68
3,273,888 A * 9/1966 Burns ...................... A61H 3/04 482/67
3,374,493 A 3/1968 Herrera
3,394,933 A 7/1968 Benoit
3,397,883 A 8/1968 Kiehn
3,721,436 A 3/1973 Barthel
3,778,052 A 12/1973 Andow et al.
3,999,228 A * 12/1976 Thomas ................. A61H 3/008 5/83.1
4,188,966 A * 2/1980 Palmer ..................... A61H 3/04 482/67
4,911,426 A 3/1990 Scales
4,973,044 A 11/1990 Jones
4,985,947 A * 1/1991 Ethridge .............. A61G 7/1017 482/68
5,022,106 A 6/1991 Richards
5,187,822 A * 2/1993 Merry .................. A61G 7/1015 414/921
5,305,773 A 4/1994 Browning
5,365,621 A 11/1994 Blain
5,411,044 A * 5/1995 Andolfi .................... A61H 3/04 414/921
5,412,820 A 5/1995 Richards
5,502,851 A 4/1996 Costello
5,603,677 A * 2/1997 Sollo .................... A61H 1/0229 606/241
5,662,560 A 9/1997 Svendsen et al.
5,695,432 A 12/1997 Soderlund
5,758,371 A 6/1998 Vandyke et al.
5,802,633 A * 9/1998 Capaldi ................ A61G 7/1046 5/83.1
5,997,444 A 12/1999 McBride
6,047,418 A 4/2000 Seide et al.
6,273,844 B1 8/2001 Kelsey et al.
6,578,594 B1 * 6/2003 Bowen ................... A61H 3/008 482/69
6,899,660 B1 * 5/2005 Chin ...................... A61H 3/008 135/85
7,354,382 B1 4/2008 Warren
8,336,133 B2 * 12/2012 Palay ................... A61G 7/1017 5/81.1 R
8,480,602 B1 7/2013 Cook
8,968,163 B1 * 3/2015 Vidmar .................. A61H 3/008 482/54
9,398,995 B2 * 7/2016 Tekulve ................. A63B 22/00
10,045,895 B2 * 8/2018 Eklof ................... A61G 7/1094
10,182,956 B2 * 1/2019 Stryker .................... A61G 5/14
10,799,409 B2 * 10/2020 Rydstrom ............ A61G 7/1051
11,396,314 B2 * 7/2022 Shen ........................ A61H 3/04
2003/0141691 A1 7/2003 Perena
2003/0141692 A1 7/2003 Perena
2004/0002407 A1 * 1/2004 Hawkes ................. A61H 3/008 482/69
2004/0063550 A1 4/2004 Harris
2005/0250624 A1 11/2005 Yu
2005/0268397 A1 * 12/2005 Nativ ................... A61G 7/1096 5/86.1
2005/0277528 A1 12/2005 Nativ
2005/0288157 A1 12/2005 Santos-Munne et al.
2006/0162069 A1 7/2006 Mowery
2007/0054784 A1 3/2007 Wu et al.
2007/0281842 A1 * 12/2007 Thornton ............... A61H 3/008 482/143
2012/0042917 A1 2/2012 Workman et al.
2013/0178767 A1 * 7/2013 Dreske ..................... A61H 3/04 601/23
2013/0219615 A1 * 8/2013 Eklof ....................... A61G 5/14 5/83.1
2015/0099614 A1 4/2015 Tekulve
2015/0115556 A1 4/2015 Ledea
2016/0166451 A1 6/2016 Tekulve
2017/0165145 A1 * 6/2017 Aryananda .......... A61G 7/1067
2018/0303697 A1 10/2018 Sulzer et al.
2019/0216674 A1 * 7/2019 Maggu ..................... A61H 3/04
2020/0113759 A1 * 4/2020 Waskowicz .............. A61G 5/14
2022/0062080 A1 * 3/2022 Pitt ........................ A61G 7/109

FOREIGN PATENT DOCUMENTS

CN 201290855 Y 8/2009
CN 103169596 A 6/2013
CN 106923992 A 7/2017
CN 107280921 A 10/2017
CN 107374917 A 11/2017
CN 108338895 A 7/2018
CN 108451750 A 8/2018
CN 108606907 A 10/2018
CN 109568089 A 4/2019
DE 193937 8/1906
DE 4335784 C1 1/1995
DE 102004043394 A1 7/2005
EP 1616547 A1 1/2006
ES 2039305 A1 9/1993
FR 1180387 A 6/1959
FR 2181522 A1 12/1973
FR 2363319 A1 3/1978
FR 2547721 A1 12/1984
FR 2854794 A1 11/2004
JP 2007229430 A 9/2007
JP 2009039283 A 2/2009
JP 2009066194 A 4/2009
JP 5115518 B2 1/2013
KR 20090049214 A 5/2009
KR 20100121243 A 11/2010
KR 101008051 B1 1/2011
KR 101980571 B1 5/2019
RU 2004230 C1 12/1993
WO 98/07402 A1 2/1998
WO 98/42258 A1 10/1998
WO 02/065969 A2 8/2002
WO 03/017894 A1 3/2003
WO 2004/080365 A1 9/2004
WO 2007/147985 A1 12/2007
WO 2013/067762 A1 5/2013
WO 2018/087651 A1 5/2018
WO WO-2021178783 A1 * 9/2021 ............ A61H 3/008

* cited by examiner

ASSISTIVE AMBULATION SYSTEMS

CROSS-REFERENCE TO RELATED APPLICATIONS

This application is a national stage application filed under 35 U.S.C. § 371 of PCT/US2021/021058 filed Mar. 5, 2021, which claims the benefit of U.S. provisional patent application No. 62/985,944, filed on Mar. 6, 2020, and titled "ASSISTIVE AMBULATION SYSTEMS," the disclosure of which is expressly incorporated herein by reference in its entirety.

BACKGROUND

Mobility aid such as wheelchairs, scooters, canes, walkers, prosthetic devices, etc. are known in the art. Certain mobility aids are capable of supporting the weight of a user's body to assist the user in moving about under his own power. Mobility aids can be used in various applications in hospitals and rehabilitation centers and the home. For example, mobility aids can be used for physical therapy in rehabilitation frons surgery or injury. Additionally, mobility aids can be used at home, for example, to transfer the user from sitting to standing (or vice versa), allow the user to complete tasks such as cooking at a conventional stove, working at conventional counters, or reaching overhead cabinets. When a user wants to dismount the mobility aid, a user is often required to align themselves adjacent a seat, and move some distance forward, backward, or to a side to transfer onto the seat, which can be difficult for a user or require third party assistance. Mobility aids also cause discomfort, such as chest pain and lung compression, to a user at contact points that support or secure the user.

SUMMARY

An example assistive ambulation system is described herein. The system includes a walker including a base frame, a walker frame attached to the base frame, a plurality of rolling members attached to the base frame, and a hoist attached to the walker. The base frame includes a pair of support members and a base cross member. Each of the support members extends between forward and rearward ends of the walker. Additionally, the pair of support members are spaced apart and substantially parallel to one another. The base cross member extends transversely between the pair of support members. The walker frame includes a pair of bent posts and a walker cross member. Each of the bent posts extends upward from the base frame. Additionally, the pair of bent posts are spaced apart and substantially parallel to one another. The walker cross member extends transversely between the pair of bent posts.

In some implementations, each of the bent posts has a serpentine shape.

Alternatively or additionally, each of the bent posts includes a lower portion, an upper portion, and a medial portion. The lower portion is arranged closer to the forward end of the walker. The upper portion is arranged closer to the rearward end of the walker. The medial portion is arranged between the upper and lower portions. Optionally, the upper portion can be arranged at approximately a center point between the forward and rearward ends of the walker.

Alternatively or additionally, a length of each of the bent posts is adjustable.

Alternatively or additionally, the system further includes a pair of upper extremity support members attached to the walker frame.

Alternatively or additionally, the system further includes a pair of anti-tip members attached to the walker frame. Additionally, the system optionally further includes a pair of hinges. Each of the anti-tip members can be attached to a respective one of the bent posts via the hinges. Optionally, each of the anti-tip members is T-shaped.

Alternatively or additionally, the system further includes a forward support member attached to the base frame and the walker frame. Optionally, the forward support member can be attached to the walker and base cross members.

Alternatively or additionally, the rolling members include a pair of forward wheels and a pair of rear casters.

Alternatively or additionally, the system further includes a harness configured to support the weight of a user. The harness is mechanically coupled to the hoist, for example, via a rope or cable. The harness includes a frame including a pair of harness members, a harness cross member, and a seat. The pair of harness members are spaced apart and substantially parallel to one another. The harness cross member extends transversely between the pair of harness members. Additionally, each of the harness members extends between the harness cross member and the seat. Optionally, a length of each of the harness members is adjustable. Alternatively or additionally, at least a portion of the frame can be covered in foam.

Alternatively or additionally, the hoist is an overhead hoist attached to the walker cross member.

Alternatively or additionally, the hoist is an electric hoist.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
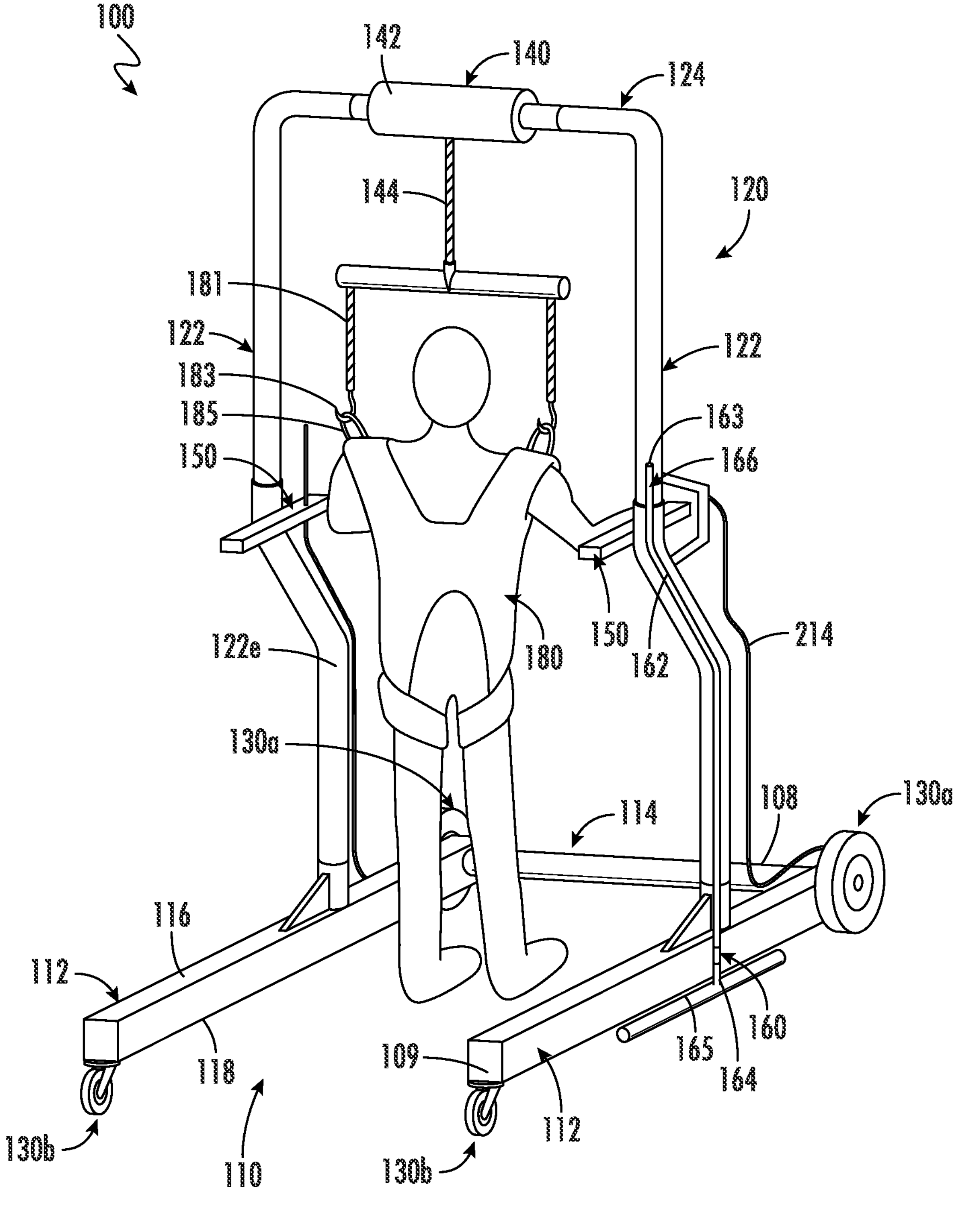
FIG. 1 is a perspective view of an assistive ambulation system according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Assistive ambulation systems are described herein. The systems described herein are combination hoist and walker that provide mobility aid. The systems described herein include an overhead frame and a hoist (e.g., a locking cable or heft-powered hoist) that is controlled by the user or an assistant. Additionally, the systems described herein include a harness that eliminates the pressure to the upper body and lungs that would be applied by conventional harnesses. The design of the frame included in the systems described herein allow the user to be in close proximity to any object in the forward position, as well as the ability to back up to furniture (e.g., a couch, bed or chair) to be able to seat themselves. The size and/or strength of the systems described herein can be constructed to suit a variety of applications. Additionally, the ability to adjust the size of the systems described herein make them adaptable for different uses such as, the user's height, operation above a treadmill and clearances of overhead obstacles.

The systems described herein can be used in various applications including hospitals, rehabilitation, centers and homes. The systems can be used to allow paraplegics and even quadriplegics to move about under their own power. This is made possible, least in part, by including a harness that eliminates pressure to the body and lungs. The systems described herein enable the user to do things like, rebuild muscle from walking, keep blood flow to extremities, reduce body sores from being stationary, move within the home, transfer from sitting to standing positions or from standing to sitting positions, cooking at a conventional stove, working at conventional counters, reaching overhead cabinets, standing eye-to-eye with other people. This disclosure also contemplates that the systems described herein may be used to travel outside of a home or other building.

Referring now to FIGS. 1-13, an example assistive ambulation system is described. The system includes a walker 100 including a base frame 110, a walker frame 120 attached to the base frame 110, a plurality of rolling members 130 attached to the base frame 110. The system also includes a hoist 140 attached to the walker 100. The walker 100 has a forward end 108 and a rearward end 109. The base frame 110 and/or the walker frame 120 may be made of any suitable material providing the desired strength. For example, the base frame 110 and/or the walker frame 120 may be formed of metal (e.g., lightweight to heavy duty metal tubing) such as steel, aluminum, a composite, or an alloy. It should be understood that a metal is provided only as an example material and that the base frame 110 and/or the walker frame 120 may be formed of any other material suitable for to provide support for the walker 100.

Figure 7:
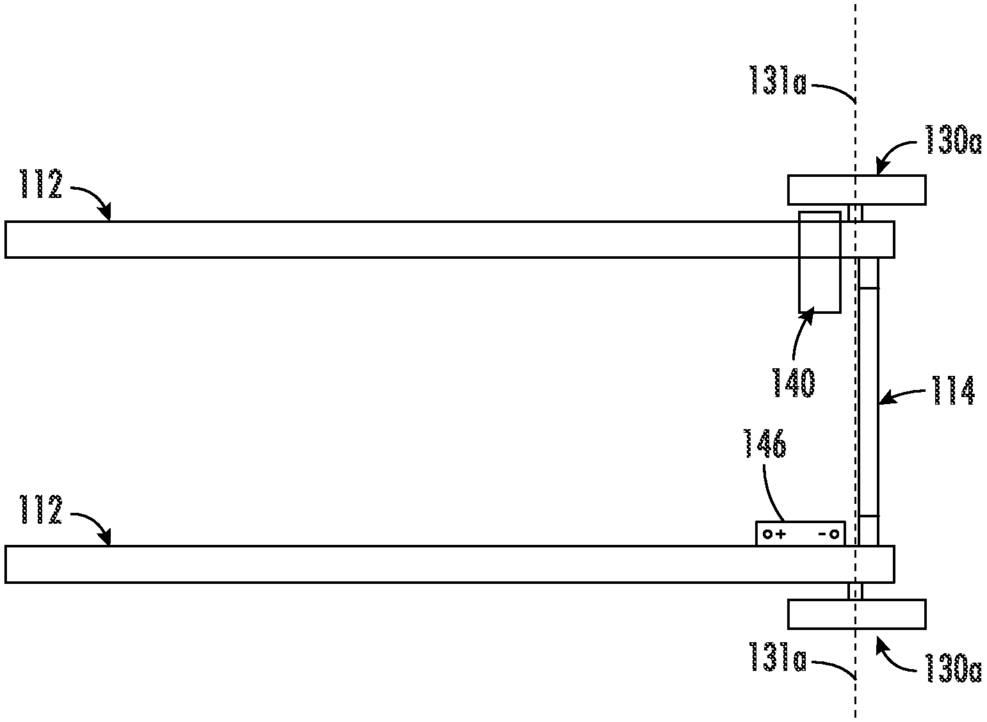
FIG. 7 is a top view of a base frame of an assistive ambulation system with the hoist mounted to the base frame according to implementations described herein.
Figure 8:
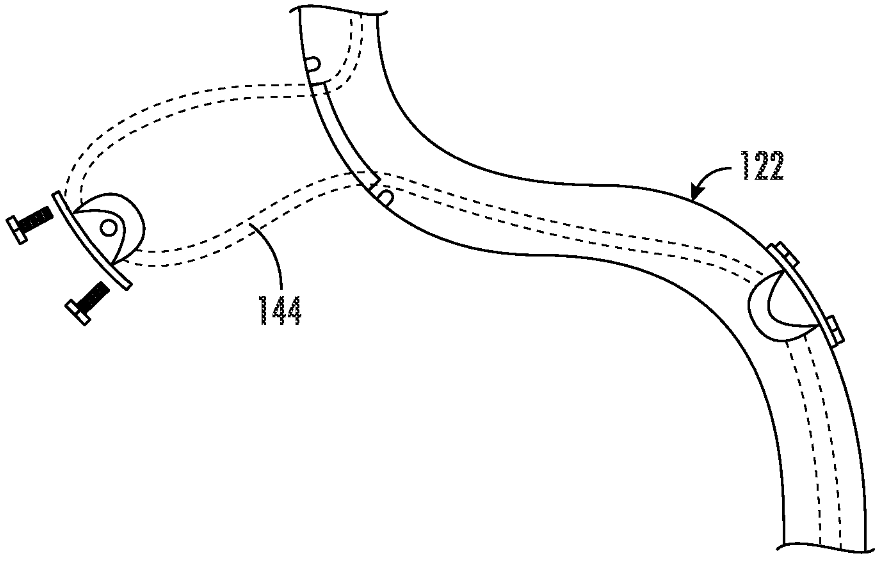
FIG. 8 illustrates a portion of a bent post of an assistive ambulation system with the hoist mounted to the base frame according to implementations described herein.
Figure 9:
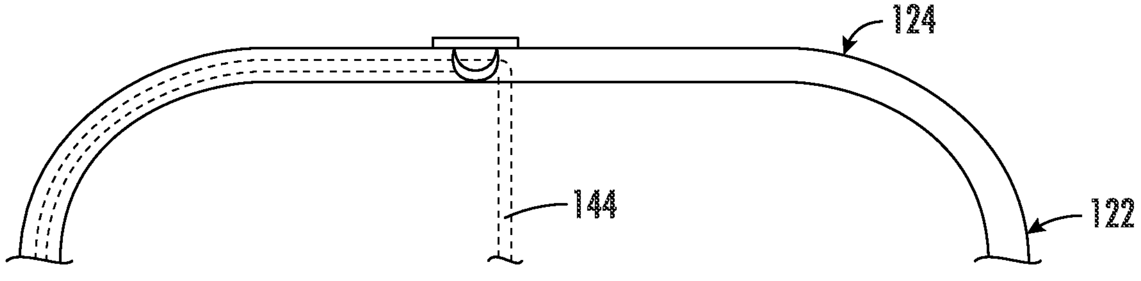
FIG. 9 illustrates a portion of a walker cross member of an assistive ambulation system with the hoist mounted to the base frame according to implementations described herein
Figure 10A:
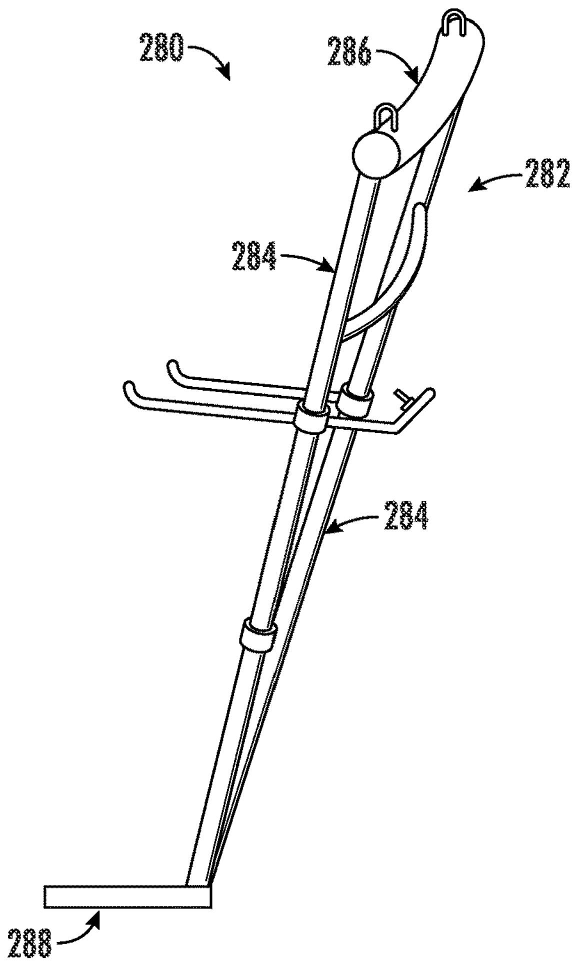
FIG. 10A is a perspective view of a harness according to implementations described herein.
Figure 10B:
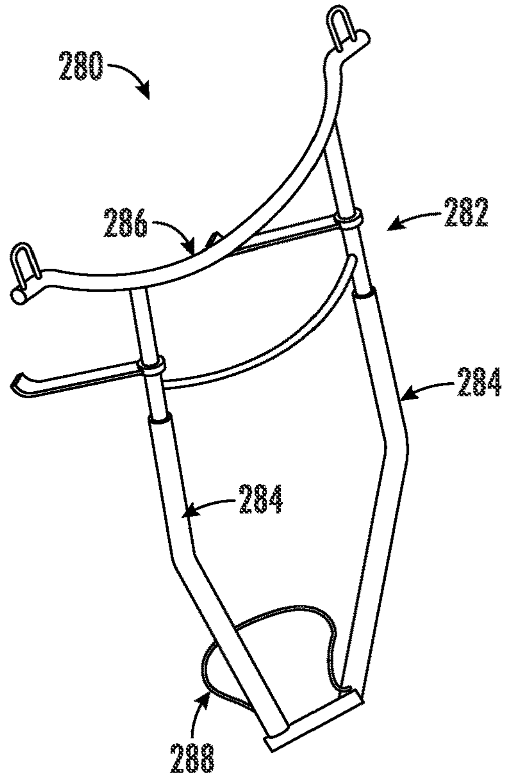
FIG. 10B is another perspective view of a harness according to implementations described herein.
Figure 11:
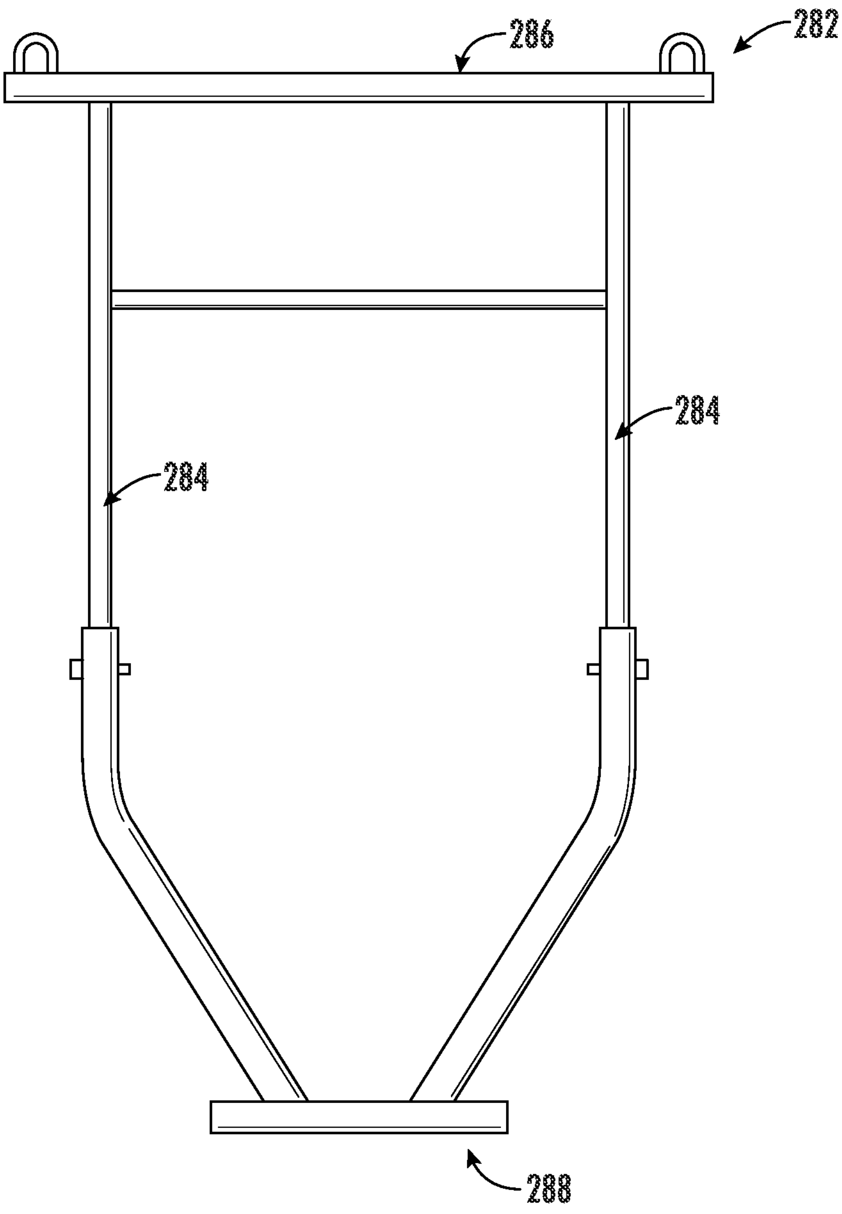
FIG. 11 is a front view of the harness shown in FIGS. 10A and 10B.
Figure 12:
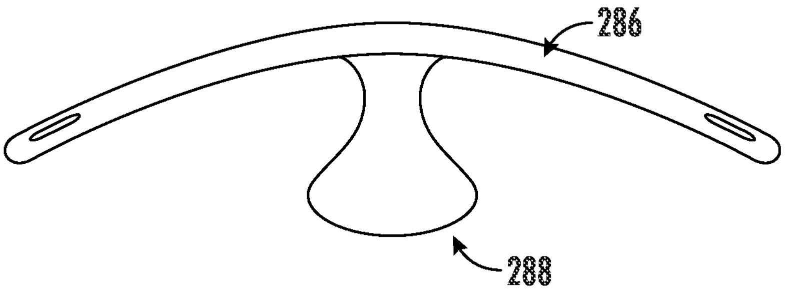
FIG. 12 is a top view of the harness shown in FIGS. 10A and 10B.
Figure 13:
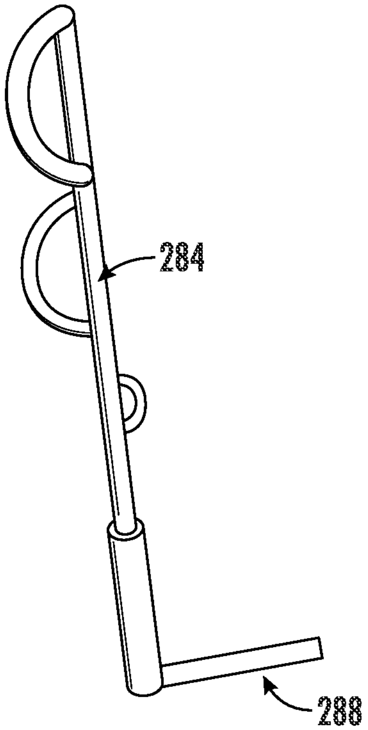
FIG. 13 is a side view of the harness shown in FIGS. 10A and 10B.

The rolling members 130 may include a pair of forward wheels 130*a* and a pair of rear casters 130*b*. The forward wheels 130*a* are stationary and larger than the rear casters 130*b*, which allow the user to navigate over obstacles such as flooring transitions or curbs. Optionally, one or more of the rolling members 130 can be provided with a locking mechanism 210. Additionally, the hoist 140 is a device used for lifting and lowering loads. Hoists are well known in the art. Hoists include, but are not limited to, manually-powered block and tackle and electric hoists (e.g., motor-driven drum or lift wheel around which rope or chain is wrapped). In some implementations described herein, the hoist 140 is an overhead hoist (e.g., attached to a cross member above the user's head as shown in FIGS. 1 and 4-6). In other implementations, the hoist 140 may be mounted to a lower portion of the frame (e.g., as shown in FIGS. 7-9 where the hoist is mounted to the base frame with cable, rope, chain, etc. running inside the walker frame).

The base frame 110 includes a pair of support members 112 and a base cross member 114. Each of the support members 112 extends longitudinally between the forward end 108 and the rearward end 109 of the walker 100. In some implementations, each of the support members 112 has a first surface 116 and a second surface 118 opposite and spaced apart from the first surface 116. The first and second surfaces 116 and 118 extend between the forward and rearward ends 108 and 109. In other implementations, each of the support members 112 has a continuous cylindrical surface, for example when the base frame 110 is formed of metal tubing. Alternatively, this disclosure contemplates that each of the support members 112 may have any other surface shape that is suitable for supporting the walker frame 120. The pair of support members 112 are opposite, spaced apart, and substantially parallel to one another. The base cross member 114 extends transversely between the pair of support members 112. In some implementations, the base cross member 114 may be a rod that forms an axle passing through the forward wheels 130. In other implementations, the base cross member 114 is fixed with respect to the support members 112, and the forward wheels 130*a* are rotatably coupled to the forward end 108 of the pair of support members 112. In other implementations, the base cross member 114 is fixed with respect to the support members 112, and an axle that passes through the forward wheels 130 is enclosed inside the base cross member 114. As shown by FIGS. 1-7, the base cross member 114 is disposed at the forward end 108. It should be understood that this arrangement is provided only as an example. In other implementations, the base cross member 114 may be disposed at a point between the forward end 108 and the rearward end 109.

As described above, the rolling members 130 include a pair of forward wheels 130*a* and a pair of rear casters 130*b*. Each forward wheel 130*a* is positioned at the forward end 108 of one of the support members 112, such that the forward wheels 130*a* are opposite and spaced apart from each other. The forward wheels 130*a* are each rotatable about their central axis 131*a* (see FIG. 4). The pair of rear casters 130*b*, on the other hand, each rotate about a wheel axis 133*a* and a caster axis 133*b* that is perpendicular to the wheel axis 133*a* (see FIG. 4). Each of the pair of rear casters 130*b* is coupled to one of the support members 112 (e.g., at the second surface 118) and positioned such that the respective caster axis 133*b* extends through the first surface 116 and the second surface 118. Each rear caster 130*b* is positioned at the rearward end 109 of one of the support members 112, such that the rear casters 130*b* are opposite and spaced apart from each other. Additionally, the front wheels 130*a* are larger than the rear casters 130*b*. For example, the diameter of the front wheels 130*a* is larger than the diameter of the rear casters 130*b*. For the reasons above, the system user can navigate over obstacles such as flooring transitions or curbs.

In the example system shown in FIGS. 1-7 each of the front wheels 130*a* includes a locking mechanism 210. The locking mechanism 210 includes a wheel lock 212, a lock cable 214, and a cable lever 216. The wheel lock 212 is coupled to the base frame 110 and is moveable between an engaged position and a disengaged position. The wheel lock 212 abuts the forward wheels 130*a* when in an engaged position, and the wheel lock 212 does not abut the front wheels 130*a* in the disengaged position. The cable lever 216 is coupled to the walker frame 120. The cable lever 216 can be manipulated by the user of the system to engage/disengage the locking member 210. The lock cable 214 extends between the wheel lock 212 and the cable lever 216 such that translation of cable lever 216 moves the wheel lock 212 between the engaged position and the disengaged position.

Although the systems shown in FIGS. 1-7 show a pair of forward wheels 130*a* and a pair of rear casters 130*b*, in other implementations, the system may include four casters, four rolling wheels, or any other wheel configuration suitable to navigate over obstacles such as flooring transitions or curbs. Additionally, although in the implementation shown in FIGS. 1-7 the locking mechanism 210 includes a wheel lock 212, a lock cable 214, and a cable lever 216, in some implementations, the locking mechanism 210 may include a foot actuator, an electric motor, a wireless controller, or any other mechanism suitable for actuating a braking mechanism for one or more of the rolling members 130. Further, although in the implementation shown in FIGS. 1-7 the locking mechanism 210 is coupled to the base frame 110 and abuts the forward wheels 130*a* when in an engaged position, in some implementations, the locking mechanism can abut at least one rear caster, provides electromagnetic resistance, or includes any other mechanism suitable to restrict the movement of the walker 100.

The walker frame 120 includes a pair of bent posts 122 and a walker cross member 124. Each of the bent posts 122 has an overhead end 122*d* and an inner surface 122*e* facing the user of the system. Each of the bent posts 122 includes a lower portion 112*a*, an upper portion 122*b*, and a medial portion 122*c*. Each of the upper portion 122*b* and the lower portion 122*a* extends in opposite axial directions from the medial portion 122*c*. Each of the bent posts 122 has a serpentine shape. In some implementations, the medial portion 122*c*, which is arranged between the upper portion 122*b* and lower portion 122*a*, forms a serpentine shape. In other implementations, the upper portion 122*b*, medial portion 122*c*, and lower portion 122*a* together form a serpentine shape. Alternatively or additionally, in some implementations, each of the upper portion 122*b* and the lower portion 122*a* of the bent posts 122 is telescopic tubing such that the length of bent posts 122 are adjustable, for example, to accommodate users having different heights.

Figure 3:
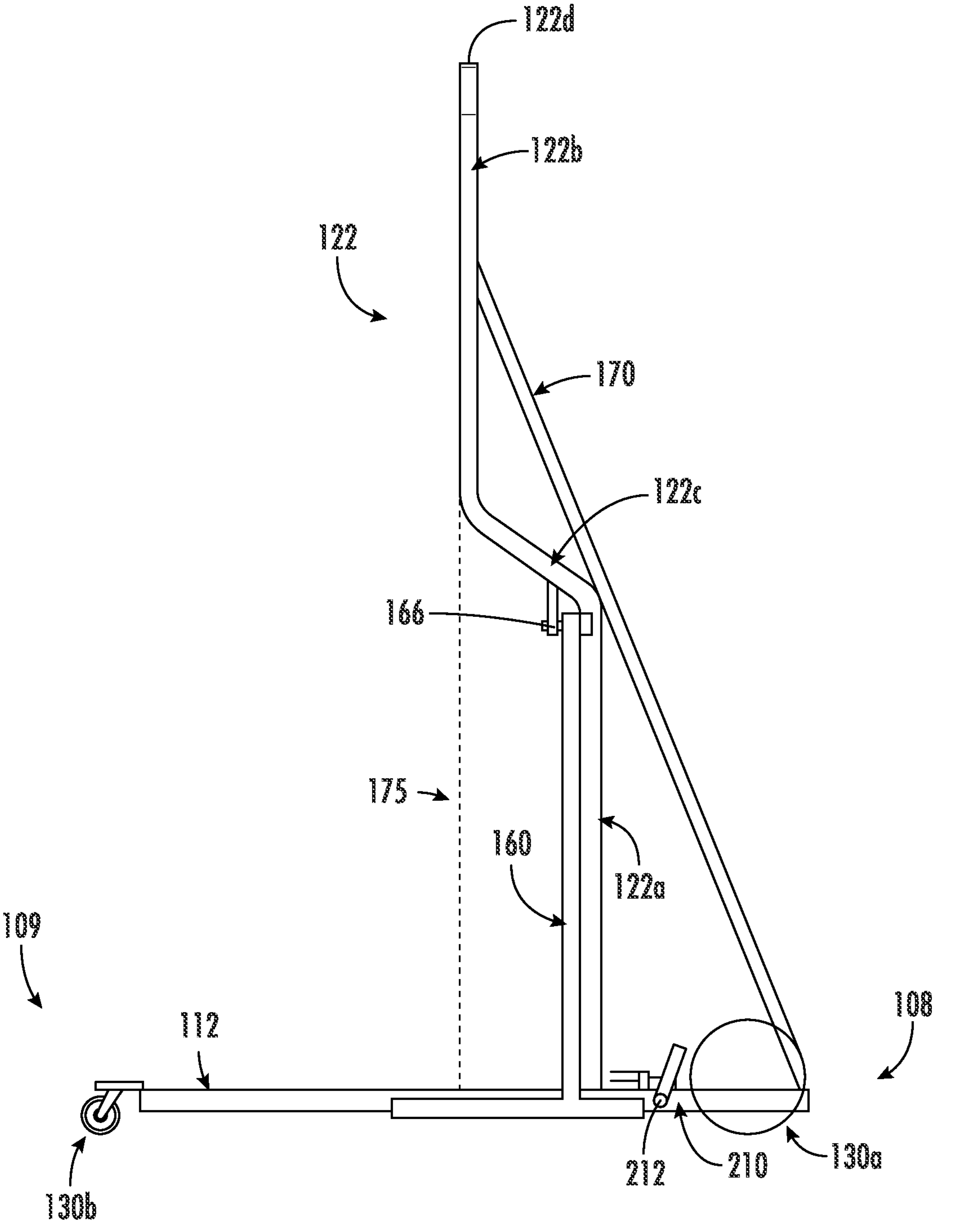
FIG. 3 is a side view of the system shown in FIG. 1.
Figure 5:
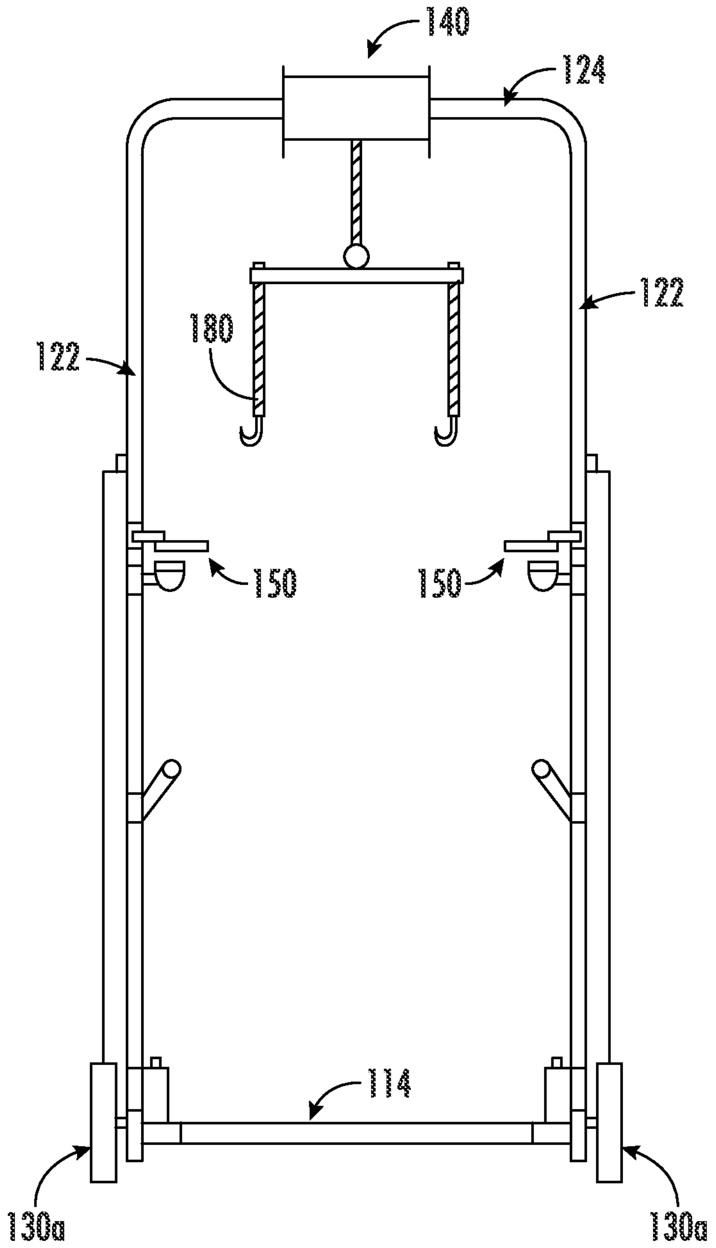
FIG. 5 is a front view of the system shown in FIG. 4.
Figure 6:
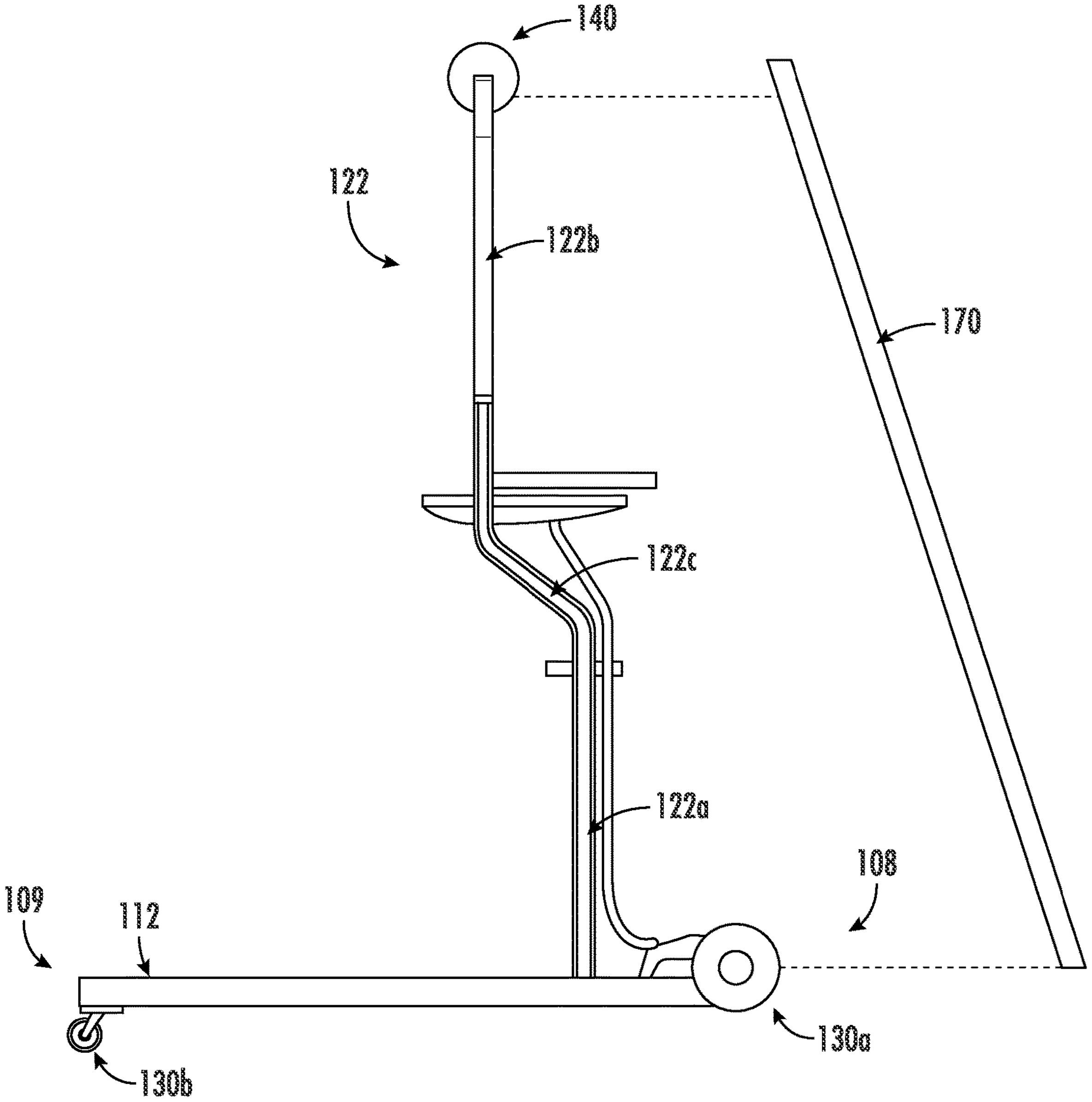
FIG. 6 is a side view of the system shown in FIG. 4.

Each of the bent posts 122 is coupled to a respective one of the support members 112 such that respective inner surfaces 122*e* of the bent posts 122 are opposite and spaced apart from each other. Each of the bent posts 122 extends from the first surface 116 of one of the support members 112 in a direction away from the second surface 118 of the support members toward its respective overhead end 122*d*. The lower portion 122*a* is arranged closer to the forward end 108 of the walker 100. The upper portion 122*b* is arranged closer to the rearward end of the walker 100. Optionally, the upper portion 122*b* is arranged at approximately a center line 175 (see FIG. 3) between the forward end 108 and rearward end 109 of the walker 100. The walker cross member 124 extends between the pair of bent posts 122 forming a bar that connects each of the bent posts 122 at their respective overhead ends 122*d*. In some implementations, the walker 100 optionally includes at least one additional support. For example, FIGS. 3 and 5 show a forward support member 170. The forward support member 170 is attached to the base frame 110 and the walker frame 120. The forward support member 170 is attachable to the base and walker cross members 114 and 124, and provides additional structural support in the forward direction.

Although FIGS. 1-7 show each of the upper portion 122*b* and the lower portion 122*a* of the bent posts 122 as telescopic tubing such that the length of the bent posts 122 are adjustable, in some implementations, either or both of the upper and lower portions 122*a* and 122*b* are not adjustable. Although FIGS. 1-7 show the bent posts 122 each forming a serpentine shape, in some implementations each of the bent posts 122 form other shapes suitable for providing support for a user of the walker 100.

As shown in FIGS. 1-6 and 10A-10B, the system optionally includes upper extremity support members 150, which are platforms that extend axially parallel to the support members 112 in a forward and rearward direction with respect to the bent posts 122. The upper extremity support members 150 are optionally each attached to the inner surface 122*e* of a respective bent post 122 at the medial portion 122*c*. The upper extremity support members 150 are disposed between the pair of bent posts 122 such that the upper extremity support members 150 are opposite and spaced apart from each other. The upper extremity support members 150 are adjustable along the axial length of the bent post 122. But, in other implementations each of the upper extremity support members 150 is fixedly coupled to the bent posts 122 such that they are not adjustable. In other implementations, the upper extremity support members 150 are coupled to the outside of the bent posts 122 or to any other portion of the walker 100 suitable to support at least a portion of a user's weight.

Alternatively or additionally, the system optionally includes a pair of anti-tip members 160 attached to the walker frame 120. The anti-tip members 160 are configured to automatically swing out if the system reaches a set degree of side angle. Each of the anti-tip members 160 as shown in FIGS. 1-4 includes a swing arm 162 and an anti-tip bar 165 (e.g., a T-shaped anti-tip member 160). The swing arm 162 has a first end 163, a second end 164, and a body that extends between the first end 163 and the second end 164. The anti-tip bar 165 extends perpendicular to the swing arm 162 and is coupled to the second end 164 of the swing arm 162 forming a T-shape. The anti-tip bar 165 provides a weight at the second end 164 of the swing arm 162. Each of the swing arms 162 is pivotably coupled to a bent post 122 by a hinges 166, such that the anti-tip bar 165 is adjacent or nearly adjacent to the outer surfaces of the support members 112 when in a resting position. As the system tips and reaches a set degree of side angle, the anti-tip bar 165 begins to swing outward with respect to the support members 112. A surface of each of the anti-tip bars 165 that is furthest from the swing arm 162 is coplanar with the second surface 118 of the support members 112.

The implementations shown in FIGS. 1-4 show the anti-tip member 160 is pivotably coupled to a bent post 122, but in other implementations, the anti-tip member 160 is coupled to the support members 112, the walker cross member 124, or any other portion of the walker 100 that is suitable to support at least a substantial portion of the weight of the walker 100. In the implementations shown in FIGS. 1-6, the anti-tip bar 165 is a bar parallel to support members 112, but in other implementations the anti-tip bar 165 can be non-parallel to the support members 112 and can be offset from the second surface 118 of the support members 112.

The base frame 110, the walker frame 120 and the anti-tip members 160 are optionally formed from a metal such as steel. But in other implementations, these components 110, 120, and 160 are made of aluminum, a composite, an alloy, or any other material suitable for to provide support for a walker user and providing a light weight structurally resilient frame. In the implementation shown in FIGS. 1-7, the base frame 110, the walker frame 120, and the anti-tip members 160 are formed from a uniform material, but in other implementations, these components are made of different materials.

As described above, the system includes a hoist 140. Hoists are devices that are used for lifting and lowering loads and are well known in the art. The hoist 140 as shown in FIGS. 1 and 4-7, is an electric block and tackle hoist. The hoist 140 includes a hoist body 142, a hoist cable 144, and a battery 146. In some implementations, the hoist 140 is coupled to the walker cross member 124 (e.g., overhead), and the hoist cable 144 is translatable from the hoist body 142 toward and away from the base members 112. The battery 146 is optionally coupled to one of the support members 112 (or other part of the walker 100) and is electrically coupled to the hoist 140. The hoist 140 shown in FIGS. 1, and 4-6 is coupled to the walker cross-member 124, but in other implementations the hoist 140 is coupled to any other part of the walker suitable to securely couple the hoist body 142. For example, FIGS. 7-9 show a hoist 240 that is mounted to the base frame 110. In the implementation shown in FIGS. 7-9, the hoist cable 144 runs along or inside the walker frame 120 and is secured thereto such that the hoist cable 144 hangs from the walker cross member 124.

The hoist cable 144 shown in FIGS. 1, 4, 8, and 9 is a fabric cable, but in other implementations, the hoist cable is a rope, a chain, or any other cable suitable for supporting a user in a walker. The hoist cable 144 shown in the implementation of FIGS. 7-9 runs inside the walker 100. In other implementations, the hoist cable may run along the bent posts 122.

The hoist 140 shown in FIGS. 1 and 4-7 is an electric hoist, but in other implementations, the hoist is a manually-powered block and tackle hoist, a motor-driven drum hoist, a lift wheel around which rope or chain is wrapped, or any other hoist that is suitable to raise and lower a harness from the walker 100.

Figure 2:
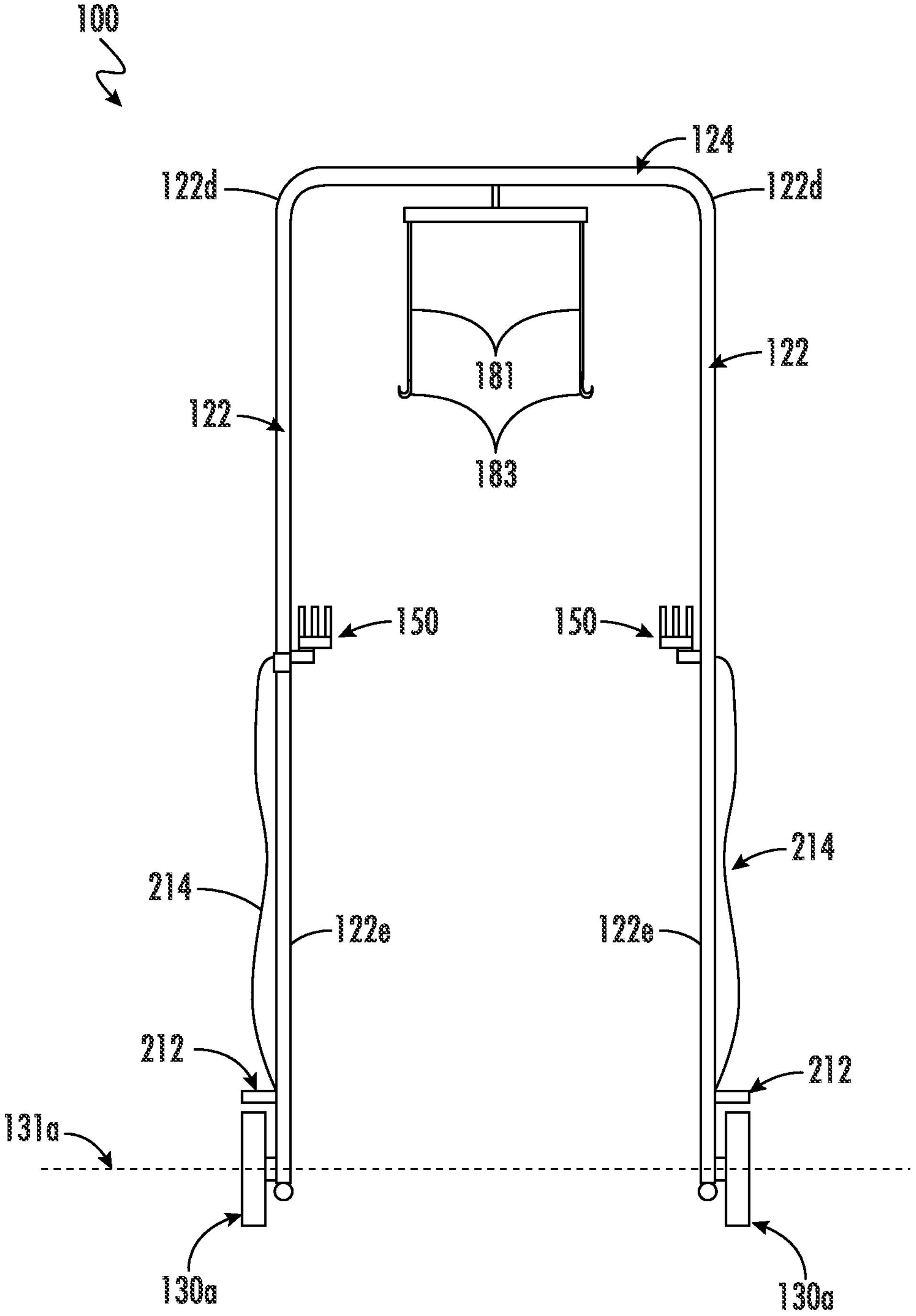
FIG. 2 is a front view of the system shown in FIG. 1.
Figure 4:
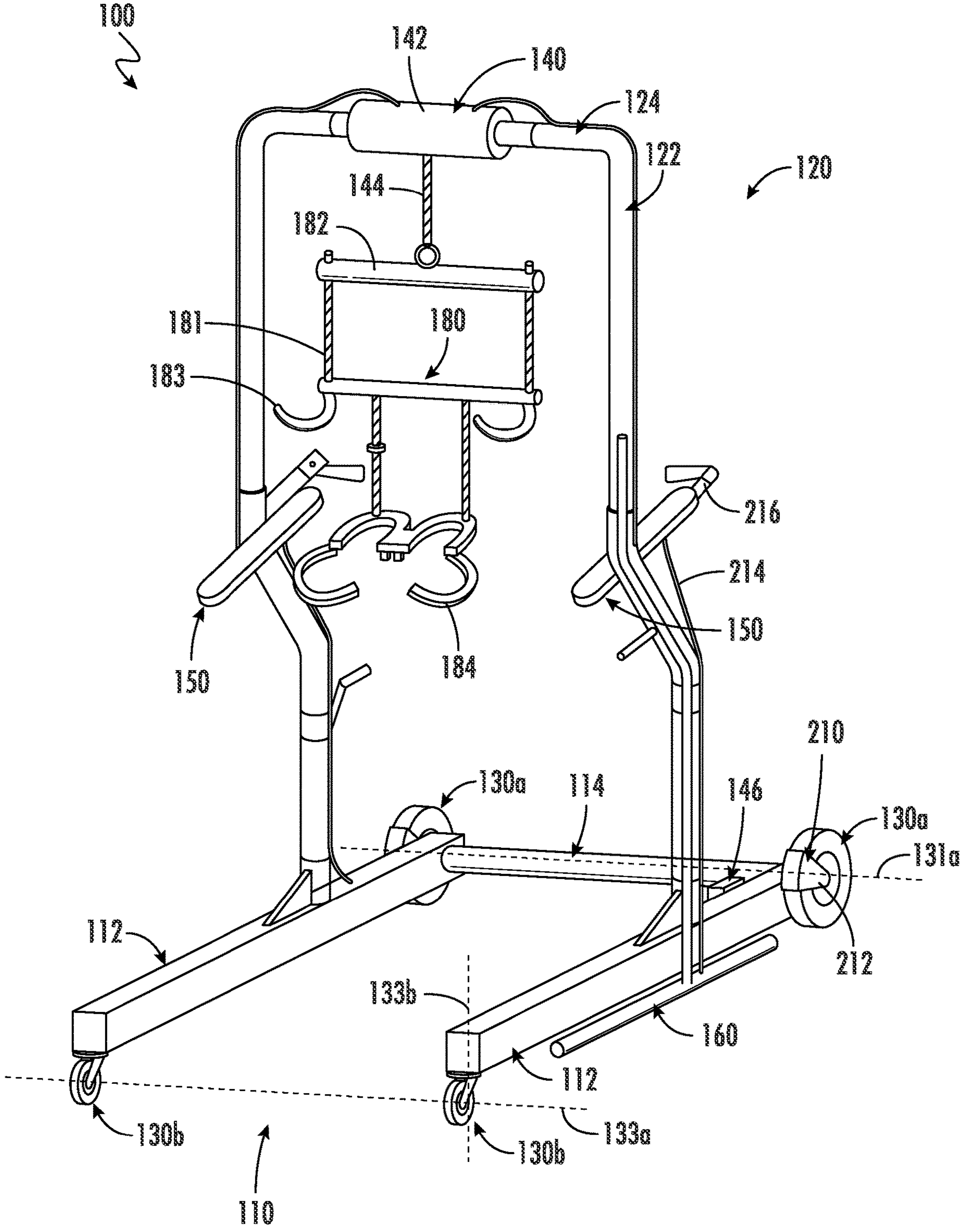
FIG. 4 is a perspective view of another assistive ambulation system according to implementations described herein.

In some implementations, the system includes a harness 180. FIGS. 1 and 4 show a harness 180 according to implementations described herein. The harness 180 is mechanically coupled to the hoist 140, for example, via a rope, cable, chain or other suitable material. The user is suspended by the hoist 140 (which may be attached via the walker cross member 124 (i.e., overhead)). As shown in FIG. 4, the harness 180 includes a support frame 182 and a pair of leg straps 184. The support frame 182 is a pair of members coupled together by a pair of harness cables 181. The leg straps 184 are two c-clamp straps that include operable and closeable c-clamps. The harness 180 is secured to the hoist 140 such that the harness 180 can be raised and lowered by the hoist 140. The harness can also be formed according to various other implementations. For example, FIGS. 10A-13 show a harness 280 that includes a frame 282 and a seat 288. The frame 282 includes a pair of harness members 284 and a harness cross member 286. The frame 282 is optionally covered in medical foam which is coupled to an outer surface of the frame 282. A portion of each of the harness members 284 is optionally telescopic tubing, such that each of the harness members 284 has an adjustable length. The seat 288 is a bicycle saddle style seat that extends in the forward and rearward directions with respect to the harness members 284. The pair of harness members 284 are opposite and spaced apart from each other. The harness cross member 286 is a curved body that extends transversely between the pair of harness members 284. The seat 288 is coupled to the harness members 284 such that each harness member 284 extends between the harness cross member 286 and the seat 288. In another example, as shown in FIGS. 1, 2, and 5 the harness 180 includes a pair of harness hooks 183 that provide a mechanism to accept harness attachments, such as a full body harness attachment 185 as shown in FIG. 1.

The harness 280 of FIGS. 10A-13 may be made of round stock steel tubing, and wider steel tubing that accepts the round stock tubing allowing the frame 282 to extend and contract. But, in other implementations, the tubing is made from aluminum, plastic, polymer, alloy, composite, or any other material suitable to provide a support for a walker user. The harness 280 is covered in medical foam, but in other implementations, the harness 280 is not covered, covered in plastic, a composite, or any other material suitable for comfortably securing a patient in a walker. The seat 288 of the harness 280 is made of foam that is thicker than the medical foam surrounding the rest of the harness 280. But in other implementations the seat 288 is made of plastic, polymer, or any other material suitable for a walker patient to sit on.

During operation of the system, a user is positioned between the bent posts 122. The user is positioned such that the walker cross member 124 is situated over the user's head. In the example shown in FIGS. 1 and 4-6 the hoist 140 is also positioned above the user's head when the user is in position to operate the system.

The user adjusts the telescoping tubing of the bent posts 122 to provide a desired height. The user lowers the harness 180, 280 to a desired position, by activating the hoist 140 that is attached to the harness 180, 280. The user is secured into the harness 180, 280 such that the harness 180, 280 supports t least a portion of the user's weight. For example, the user is secured by clamping the leg clamps 184 in the implementation shown in FIGS. 1 and 4 or, the user sits in the seat 288 in the implementation shown in FIGS. 10A-13. In this implementation shown in FIGS. 10A-13, the user is further secured by resting their chest on the harness cross member 286. The curve of the harness cross member 286 reduces or eliminates pressure to the user's body and lungs by providing a contoured shape to accommodate the chest. The foam provided on the harness also cushions the user for increased comfort. The harness 180, 280 is mechanically coupled to the hoist 140, via a rope, cable, chain, etc. (e.g., cable 144) so that the user can be at least partially suspended thereby. For example in the implementations shown in FIGS. 1-7, the user is suspended by the hoist 140 which is attached overhead via the walker cross member 124 (FIGS. 1-6) or attached to the base frame 110 (FIG. 7). The rope or cable, working in combination with the upper extremity support members 150 and/or the rolling members 130, gives the user freedom to turn left or right and steer the walker 100 in the desired direction. The user can further secure their weight on the walker 100 by resting their arms on the upper extremity support member 150.

The user moves the wheel locking mechanism 210 into an unlocked position. For example, in the implementation shown in FIGS. 1-7 the user actuates the cable lever 216. The user—secured to the walker 100—can move about over varied terrain such as curbs and uneven pavement. The size of the front wheels 130*a* allows the front wheels 130*a* to roll over various terrain, and the dexterity of the rear casters 130*b* allows the walker 100 to rotate in tight spaces. As the user moves, the anti-tip members 160 provide a safety measure in case the walker 100 begins to tip over. The anti-tip bars 165 provide a weight at the end of each swing arm 162 such that the anti-tip members 160 extend outward relative to the bent posts 122 remaining in an upright position with respect to the surface that the walker 100 is traveling on. The anti-tip bar 165 provides a support surface that rests against the surface that the walker 100 is traveling on, which provides a stable surface to prevent the walker from completely tipping over and allowing a user to regain balance and set the walker 100 fully upright again. As described above, the anti-tip members 160 are pivotably coupled to the bent posts 122 which provides a mechanism for the anti-tip members 160 to automatically swing out if the system reaches a set angle with respect to the surface the walker 100 travels on.

A user can position themselves in an ideal location to dismount from the walker 100. The walker 100 facilitates the user's ability to get in close proximity to any object in the forward position, as well as back up to furniture such as a couch, bed or chair to be able to seat themselves. This is due, at least in part, by providing bent posts 122 having a serpentine shape. In this way, the lower portions 122*a* of the bent posts 122 are disposed closer to the forward end 108 and the upper portions 122*b* of the bent posts 122 are disposed closer to the reward end 109 (e.g., at or near center line 175 shown in FIG. 3). Thus, the walker 100 provides a space in the rearward direction such that the base members 112 of the walker can be positioned on either side of an external seat or underneath a seat, allowing a user to position themselves over it. The user engages the wheel locking mechanism 210 by moving the cable lever 216 in the implementation shown in FIG. 4. The user dismounts from the walker 100 to a desired location. For example, the user can detach the leg clamps shown in FIG. 4 or the user can dismount from the seat 288 shown in FIGS. 10A-13. The harness is lifted away from the user by activating the hoist 140 and storing the harness in a desired position.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:

a walker comprising:

a base frame including a pair of support members and a base cross member, each of the support members extending between forward and rearward ends of the walker, the pair of support members being spaced apart and substantially parallel to one another, and the base cross member extending transversely between the pair of support members, and a walker frame attached to the base frame, the walker frame including a pair of bent posts and a walker cross member, each of the bent posts extending upward from the base frame, the pair of bent posts being spaced apart and substantially parallel to one another, and the walker cross member extending transversely between the pair of bent posts;

a plurality of rolling members attached to the base frame;

a hoist attached to the walker;

a pair of anti-tip members attached to the walker frame; and a pair of hinges, wherein each of the anti-tip members is attached to a respective one of the bent posts via the hinges.

2. The system of claim 1, wherein each of the bent posts has a serpentine shape.

3. The system of claim 1, wherein each of the bent posts comprises a lower portion arranged closer to the forward end of the walker, an upper portion arranged closer to the rearward end of the walker, and a medial portion arranged between the upper and lower portions.

4. The system of claim 3, wherein the upper portion is arranged at approximately a center point between the forward and rearward ends of the walker.

5. The system of claim 1, wherein a length of each of the bent posts is adjustable.

6. The system of claim 1, further comprising a pair of upper extremity support members attached to the walker frame.

7. The system of claim 1, wherein each of the anti-tip members is T-shaped.

8. The system of claim 1, further comprising a forward support member attached to the base frame and the walker frame.

9. The system of claim 8, wherein the forward support member is attached to the walker and base cross members.

10. The system of claim 1, wherein the rolling members comprises a pair of forward wheels and a pair of rear casters.

11. The system of claim 1, further comprising a harness configured to support the weight of a user, wherein the harness is mechanically coupled to the hoist.

12. The system of claim 11, wherein the harness is mechanically coupled to the hoist via a rope or cable.

13. The system of claim 11, wherein the harness comprises a frame including a pair of harness members, a harness cross member, and a seat, the pair of harness members being spaced apart and substantially parallel to one another, the harness cross member extending transversely between the pair of harness members, and each of the harness members extending between the harness cross member and the seat.

14. The system of claim 13, wherein the harness cross member is curved.

15. The system of claim 13, wherein a length of each of the harness members is adjustable.

16. The system of claim 13, wherein at least a portion of the frame is covered in foam.

17. The system of claim 1, wherein the hoist is an overhead hoist attached to the walker cross member.

18. The system of claim 1, wherein the hoist is an electric hoist.

* * * * *